(12) United States Patent
Challener et al.

(10) Patent No.: US 7,581,253 B2
(45) Date of Patent: Aug. 25, 2009

(54) SECURE STORAGE TRACKING FOR ANTI-VIRUS SPEED-UP

(75) Inventors: David Carroll Challener, Raleigh, NC (US); John Peter Karidis, Ossining, NY (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 566 days.

(21) Appl. No.: 10/894,588

(22) Filed: Jul. 20, 2004

(65) Prior Publication Data

US 2006/0021032 A1 Jan. 26, 2006

(51) Int. Cl.
G06F 11/00 (2006.01)

(52) U.S. Cl. .......................................... 726/24; 726/22

(58) Field of Classification Search .................. 726/24, 726/22, 23, 25; 713/188; 714/38; 710/261
See application file for complete search history.

(56) References Cited

U.S. PATENT DOCUMENTS

| | | | |
|---|---|---|---|
| 5,367,682 A | 11/1994 | Chang | |
| 5,511,184 A | 4/1996 | Lin | |
| 5,649,095 A * | 7/1997 | Cozza | 714/39 |
| 5,657,473 A | 8/1997 | Killean et al. | |
| 6,021,510 A * | 2/2000 | Nachenberg | 714/38 |
| 6,067,618 A | 5/2000 | Weber | |
| 6,092,161 A | 7/2000 | White et al. | |
| 6,268,789 B1 * | 7/2001 | Diamant et al. | 340/5.74 |
| 6,272,533 B1 | 8/2001 | Browne | |
| 6,324,627 B1 | 11/2001 | Kricheff et al. | |
| 6,526,488 B1 * | 2/2003 | White et al. | 711/163 |
| 6,591,362 B1 | 7/2003 | Li | |
| 6,735,700 B1 * | 5/2004 | Flint et al. | 726/24 |
| 6,763,466 B1 * | 7/2004 | Glover | 726/24 |
| 6,802,028 B1 * | 10/2004 | Ruff et al. | 714/38 |
| 7,134,006 B2 * | 11/2006 | Flanigan | 713/1 |
| 7,216,366 B1 * | 5/2007 | Raz et al. | 726/24 |
| 2002/0073055 A1 * | 6/2002 | Chess et al. | 707/1 |
| 2002/0169987 A1 * | 11/2002 | Meushaw et al. | 713/201 |
| 2003/0074574 A1 * | 4/2003 | Hursey et al. | 713/200 |
| 2003/0120952 A1 * | 6/2003 | Tarbotton et al. | 713/201 |
| 2004/0158730 A1 * | 8/2004 | Sarkar | 713/200 |

FOREIGN PATENT DOCUMENTS

| | | |
|---|---|---|
| EP | 0560277 | 9/1993 |
| EP | 1 056 010 A1 | 11/2000 |
| JP | 9138733 | 5/1997 |

OTHER PUBLICATIONS

Goldberg, Robert P., A Survey of Virtual Machine Research, Jun. 1974, IEE Computer, vol. 9, No. 6, pp. 34-45.*

Reidle, L. et al, Method and System for Providing a Secure Rapid Restore Backup of a Raid System, U.S. Appl. No. 10/602,317, filed Jun. 24, 2003.

* cited by examiner

Primary Examiner—Nasser G Moazzami
Assistant Examiner—Michael S McNally
(74) Attorney, Agent, or Firm—Ference & Associates LLC

(57) ABSTRACT

A computer system includes a security subsystem which is able to trustfully track which files or storage areas of a storage device have been altered since a last virus scan. The trusted information can then be used to accelerate scans for undesirable code or data such as viruses and invalid or corrupt registry entries. In the case of viruses, files or storage areas which have been altered are scanned against a super-set of virus definitions. Unaltered files or storage areas are scanned against a subset of virus definitions.

36 Claims, 11 Drawing Sheets

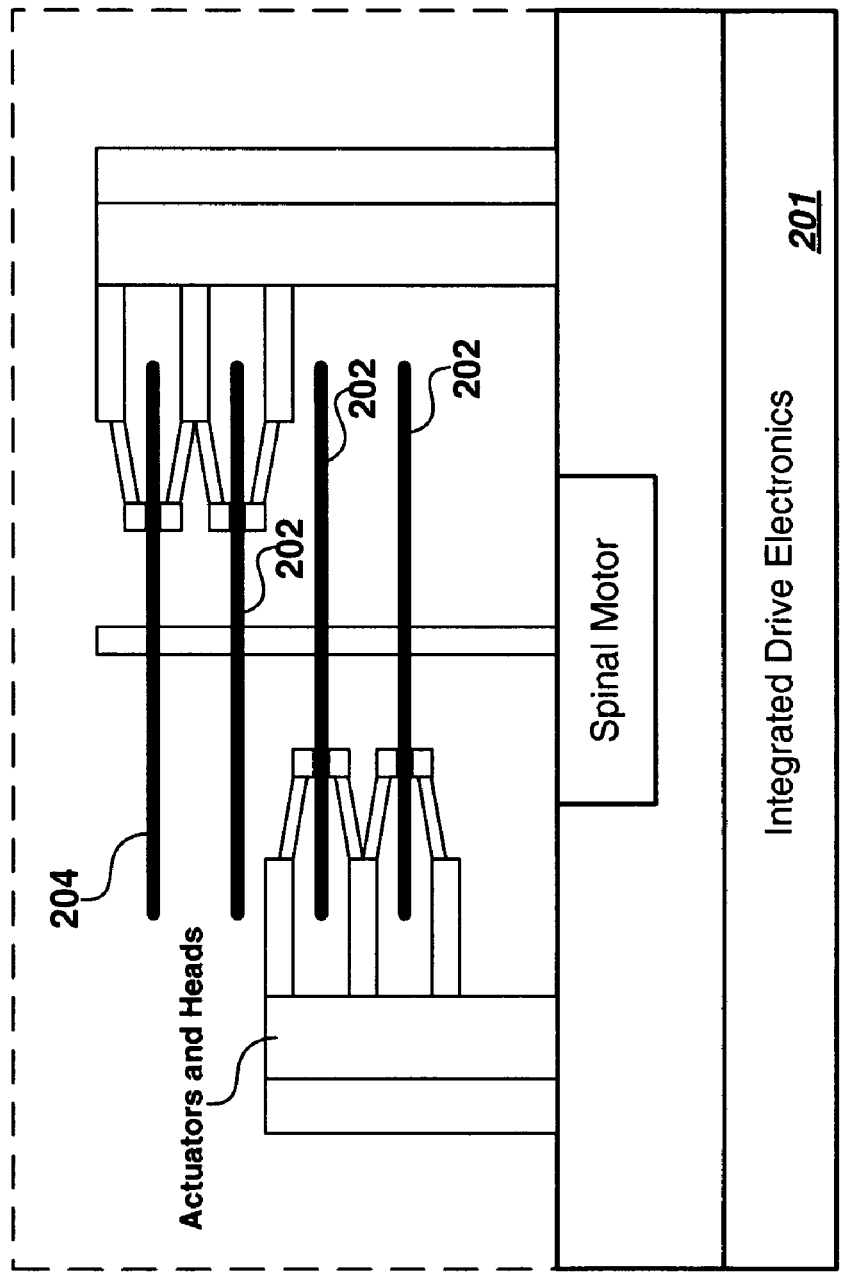

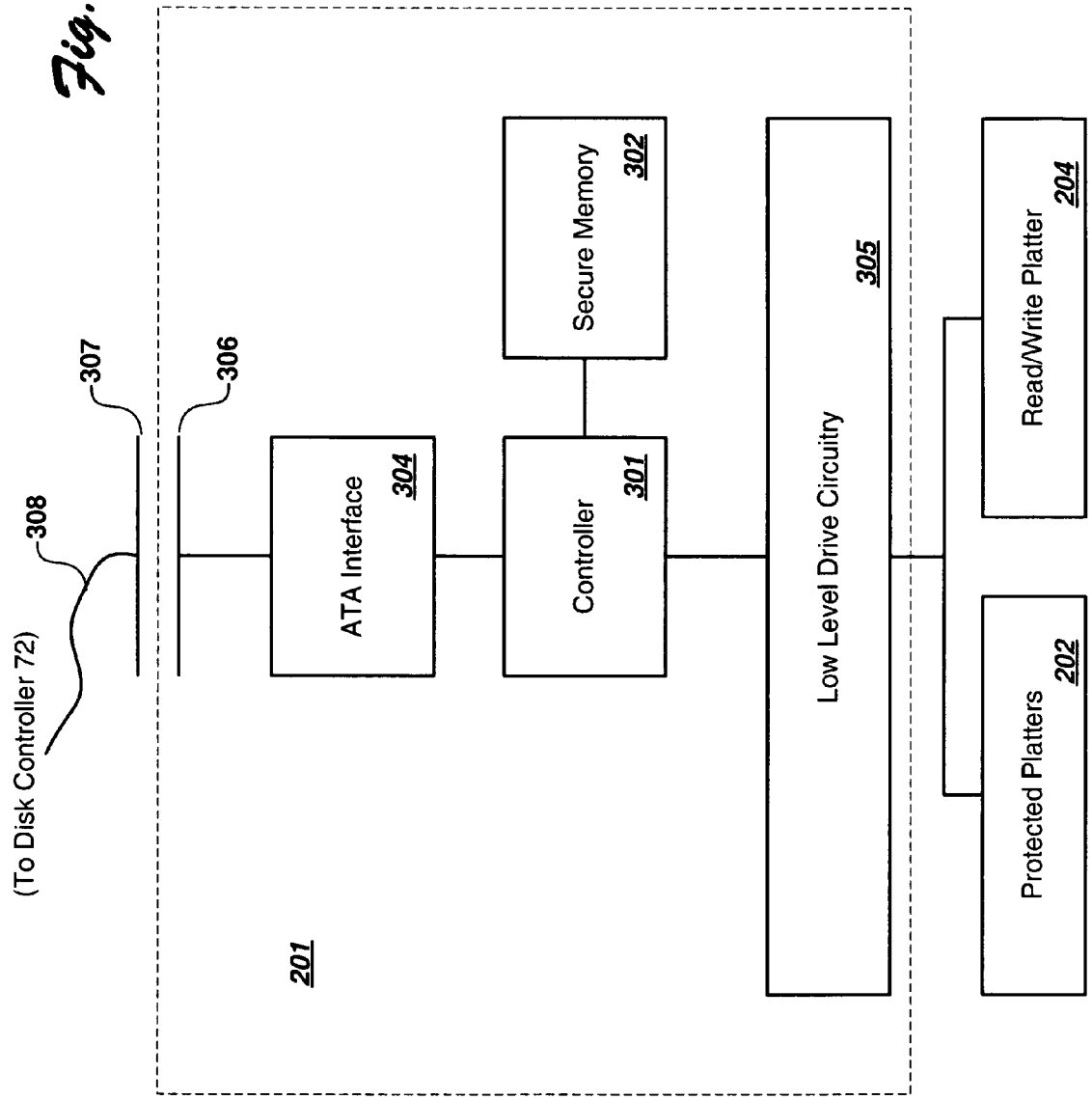

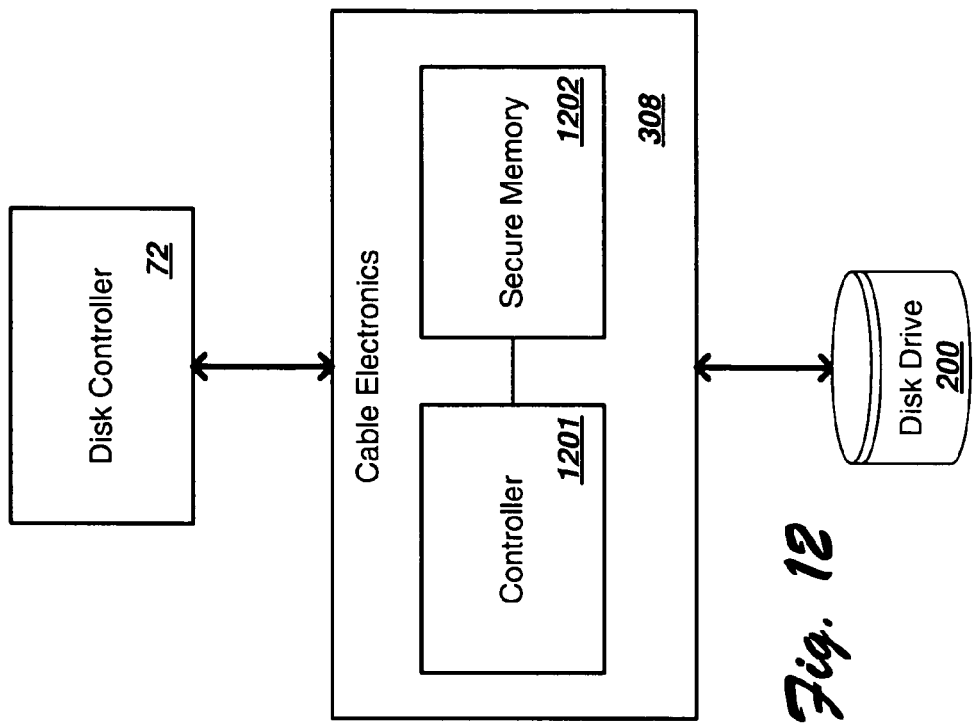
Fig. 12
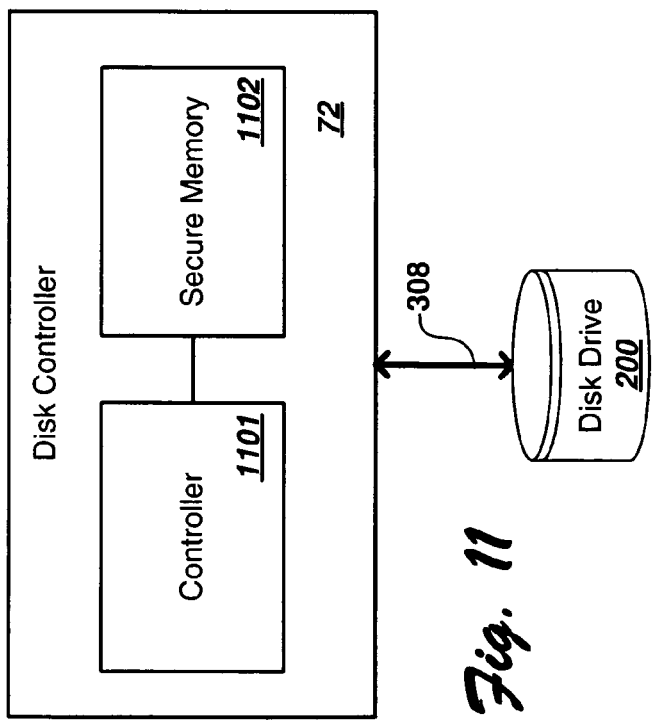
Fig. 11
Fig. 10

SECURE STORAGE TRACKING FOR ANTI-VIRUS SPEED-UP

BACKGROUND OF THE INVENTION

This invention pertains to methods, program products, computer systems and other information handling systems which enable accelerated scanning for undesirable or malicious code and, more particularly, to a computer system which trustfully tracks which files or storage locations have changed since a last virus scan and allows for accelerated virus scans by scanning only those files which have changed or files which are unchanged but which have not been scanned for new viruses.

While early computers were "stand alone" and unable to communicate with other computers, most computers today are able to communicate with other computers for a variety of purposes, including sharing data, e-mailing, downloading programs, coordinating operations, etc. This communication is achieved by logging onto a Local Area Network (LAN) or a Wide Area Network (WAN). While this expanded horizon has obvious benefits, it comes at the cost of increased exposure to mischief, particularly from viruses.

A virus is programming code that, analogous to its biological counterpart, usually infects an otherwise healthy piece of code or data. The virus causes an undesirable event, such as causing the infected computer to work inefficiently, or else fail completely. Another insidious feature of many viruses is their ability to propagate onto other computers on the network.

At least four main classes of viruses can be found including file infectors, system (or boot-record) infectors, worms and macro viruses. A file infector attaches itself to a program file. When the program is loaded, the virus is loaded as well, allowing the virus to execute its mischief. A system infector infects the registry of an operating system or specific hardware such as the master boot record in a hard disk. A master boot record infection will often make the hard drive inoperable upon a subsequent re-boot, making it impossible to boot-up the computer. A worm virus consumes memory or network bandwidth, thus causing a computer to be non-responsive. A macro virus is among the most common viruses, and infects word processor programs.

Another common type of virus is aimed at browsers and e-mail. One such virus causes a Denial of Service (DoS) attack. A DoS virus causes a website to become unable to accept visitors. Usually, such attacks cause the buffer of the website to overflow, as a result of millions of infected computers being forced (unwittingly) to hit the website.

To counter viruses, anti-viral programs are written, and are constantly updated to be effective against new viruses. Such anti-viral programs are delivered either on physical media (such as CD-ROMs), or are downloaded off a network such as the Internet. The anti-virus programs compare data on each storage device of the computer system to a virus definition file which includes all known virus signatures for all known virus types. This process is termed "scanning." Updates are typically downloaded as well, in order to provide rapid deployment of such updates.

However, the time required to complete a virus scan is becoming increasingly unacceptable and problematic. Two factors which contribute to unacceptable scan times are the amount of data which is being scanned and the size of the virus definition file containing the identifiers. Both of these factors are growing seemingly without limits. It will soon become common for desktop systems to have disk capacities which approach one terabyte. Hackers which create viruses appear to have increasing motivation for doing so and are doing so at ever increasing rates. Meanwhile, the time it takes for scanning the hard disk does not increase significantly with increased processor speed since the time required for the scanning process is more related to disk access speeds. Problems caused by increased scan times will become more acute and more visible with time. It is foreseeable that daily virus scans will not be possible in the near future simply because, given these factors, a virus scan will eventually take longer than 24 hours to complete. Furthermore, a workstation can be rendered unusable during the time in which the scanning process takes place. Productivity is therefore impacted and eventual cost analyses will reveal that additional system cost is justified in order to rectify the problem.

Another area of background entails virtual machines and virtual machine monitors which arose out of the need to run applications written for different operating systems concurrently on a common hardware platform, or for the full utilization of available hardware resources. Virtual machine monitors were the subject of research since the late 1960's and came to be known as the "Virtual Machine Monitor" (VMM). Persons of ordinary skill in the art are urged to refer to, for example, R. P. Goldberg, "Survey of Virtual Machine Research," IEEE Computer, Vol. 7, No. 6, 1974. During the 1970's, as a further example, International Business Machines Corporation adopted a virtual machine monitor for use in its VM/370 system.

A virtual machine monitor, sometimes referred to in the literature as the "hypervisor," is a thin piece of software that runs directly on top of the hardware and virtualizes all the hardware resources of the machine. Since the virtual machine monitor's interface is the same as the hardware interface of the machine, an operating system cannot determine the presence of the VMM. Consequently, when the hardware interface is one-for-one compatible with the underlying hardware, the same operating system can run either on top of the virtual machine monitor or on top of the raw hardware. It is then possible to run multiple instances of operating systems or merely instances of operating system kernels if only a small subset of system resources are needed. Each instance is referred to as a virtual machine. The operating system can be replicated across virtual machines or distinctively different operating systems can be used for each virtual machine. In any case, the virtual machines are entirely autonomous and depend on the virtual machine monitor for access to the hardware resources such as hardware interrupts.

SUMMARY OF THE INVENTION

What is needed, therefore, are apparatus, program products, and methods which allow for accelerated scan times without compromising security. Furthermore, what is needed is an apparatus which provides a platform by which such reduced scan times can be achieved. Additionally, what is needed are program products and methods which utilize the secure platform provided by the apparatus to perform scans in a more efficient and secure manner.

As will be seen, the embodiments disclosed satisfy the foregoing needs and accomplish additional objectives. Briefly described, the present invention provides methods, program products, and systems which are able to trustfully track which files or storage areas of a storage device have been altered since a last virus scan. Furthermore, a secure area is provided for storing trusted variables which pertain to prior scans. The trusted information can then be used to accelerate scans for undesirable code or data by reducing the number of files scanned, and or by reducing the number of undesirable code identifiers used for scanning.

It has been discovered that the aforementioned challenges are addressed, according to one aspect of the present invention, by a system which includes a processor and a main memory for storing code which is executed under a first operating system by the processor, a security system having a secure memory which is inaccessible to the code which is executed under the first operating system, and a storage device which is subdivided into a first area and a read-write area. The first area is securely configurable under the control of the security system between a normal read-only state and a writeable state. The security system maintains at least one trusted variable in the secure memory. The trusted variable identifies the occurrence of a last scan for malicious code on the storage device and responds to a request for status related to the last scan by referencing the trusted variable and reporting a related result. In addition, the security system invokes an authentication procedure out of the secure memory in response to a provided request to configure the first area to the writeable state.

According to one aspect of the present invention which addresses the aforementioned challenges, a method is provided which includes querying a security subsystem to trustfully determine whether an area of a storage device has been written to since a last scan. The security subsystem includes a memory which is inaccessible to code executing from an operating system. The determination avails trust through a reference to the inaccessible memory by the security subsystem. The method further includes scanning the area for an identifier of undesirable code in response to a trusted determination from the query that the area has been written to since the last scan.

According to one aspect of the present invention, a method is provided which includes querying a security subsystem to trustfully determine whether an area of a storage device has been written to since a last scan. The security subsystem includes a memory which is inaccessible to code executing from an operating system. The determination avails trust through a reference to the inaccessible memory by the security subsystem. The method further includes determining whether a prior identifier of undesirable code was included in the last scan and bypassing a scan of the area for the prior identifier of undesirable code in response to (1) a determination from the query that the area has not been written to since the last scan and in response to (2) a determination that the prior identifier was included in the last scan.

According to one aspect of the present invention, a method is provided which includes querying a security subsystem to trustfully determine whether an area of a storage device has been written to since a last scan. The security subsystem includes a memory which is inaccessible to code executing from an operating system. The determination avails trust through a reference to the inaccessible memory by the security subsystem. The method further includes scanning the first area for known identifiers of undesirable code in response to a trusted determination from said query that the first area has been written to since the last scan, determining whether a prior identifier of undesirable code was included in the last scan, and bypassing a scan of the first area for the prior identifier of undesirable code in response to (1) a determination from said query that the first area has not been written to since the last scan and in response to (2) a determination that the prior identifier was included in the last scan.

In one aspect of the present invention, a method is provided which includes scanning files in a read-write area of a storage device for malicious code. The storage device is subdivided into a first area and the read-write area. The first area is securely configurable between a normal read-only state and a writeable state. The configuration of the areas is under the control of a security system having a secure memory which is inaccessible to code executed under an operating system. The method further includes, upon successfully scanning at least one file in which no malicious code is found, activating and authenticating a first security measure of the security system to configure the first area to the writeable state, wherein the authentication executes out of the secure memory; writing successfully scanned files in the read-write area to the first area; and configuring the first area to the read-only state after the writing of successfully scanned files.

Various aspects of the present invention may be provided as a computer program product which may include a machine-readable medium having stored thereon instructions which may be used to program a computer (or other electronic devices) to perform a process according to the any of the embodiments of the present invention.

BRIEF DESCRIPTION OF THE DRAWINGS

Some of the purposes of the invention having been stated, others will appear as the description proceeds, when taken in connection with the accompanying drawings, in which:

FIG. 2 is a simplified schematic side elevation view of a disk drive having protected areas, read/write areas, and integrated drive electronics adapted to provide secure tracking of data references and secure data protection in accordance with a preferred embodiment of the invention;

FIG. 3 is an expanded view block diagram of the integrated drive electronics of the disk drive used in the preferred embodiment of the invention and includes other hardware which is peripheral to the integrated drive electronics;

FIG. 10 is a table of timestamp entries, one for each of the read/write and protected areas, according to the preferred embodiment of the present invention in which timestamps are stored in a secure memory after each successful run of a virus scan in each respective area;

FIG. 11 is a block diagram of one embodiment according to the present invention in which a controller and a secure memory are located in the disk controller;

FIG. 12 is a block diagram of one embodiment according to the present invention in which a controller and a secure memory are located in the IDE cable;

DETAILED DESCRIPTION OF THE ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Referring now more particularly to the accompanying drawings, in which like numerals indicate like elements or steps throughout the several views, a preferred embodiment of the present invention will be described. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Figure 1:
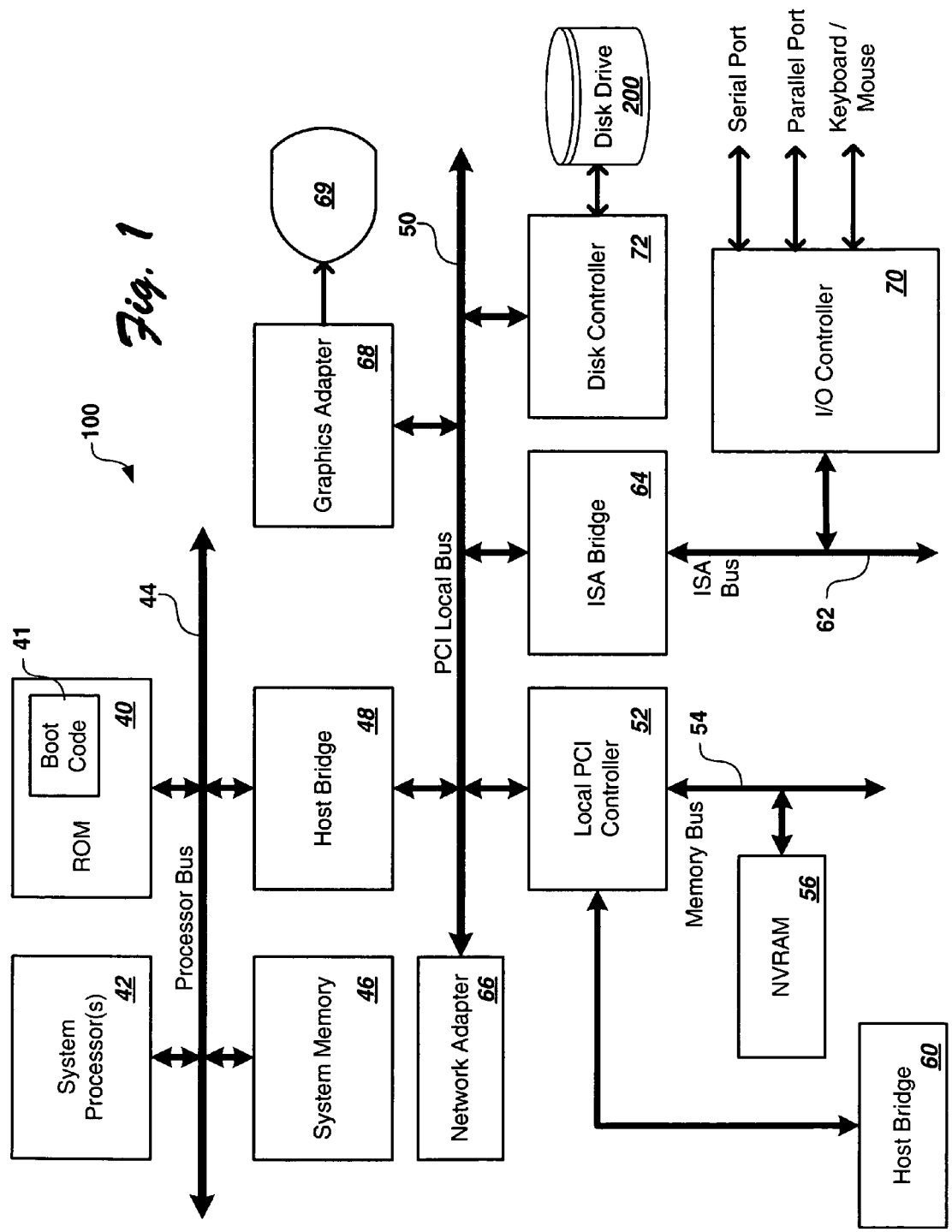
FIG. 1 is a block diagram of a computer system according to a preferred embodiment of the present invention which incorporates resources which enable accelerated scanning for malicious code.

FIG. 1 is a block diagram of a computer system according to a preferred embodiment of the present invention which incorporates resources which enable accelerated scanning for undesirable code including malicious code such as viruses. The illustrative embodiment depicted in FIG. 1 may be a desktop computer system, such as one of the ThinkCentre® or ThinkPad® series of personal computers, or a workstation computer, such as the Intellistation®, which are sold by International Business Machines (IBM) Corporation of Armonk, N.Y.; however, as will become apparent from the following description, the present invention is applicable to increasing the efficacy and security of virus scans and the like in any data processing system.

As shown in FIG. 1, computer system 100 includes at least one system processor 42, which is coupled to a Read-Only Memory (ROM) 40 and a system memory 46 by a processor bus 44. System processor 42, which may comprise one of the PowerPC™ line of processors produced by IBM Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to LAN 10, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60. EIDE disk controller 72 governs accesses or references made to and from disk drive 200 by any other system component including processor 42.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a keyboard and a mouse. In addition, I/O controller 70 supports external communication by computer system 100 via serial and parallel ports.

Those of ordinary skill in the art have a working knowledge of operating systems and file systems in general. With regard to FAT file systems, Chapter Eight of *Advanced MS-DOS: The Microsoft guide for Assembly Language and C Programmers*, by Ray Duncan, ISBN 0-914845-77-2, 1986, which describes the structure of a FAT file system, is incorporated herein by reference. While the FAT file system is used in the preferred embodiment, other file systems can be used without departing from the spirit and scope of the present invention.

As used herein, a cluster is a logical unit used by the file system driver of the operating system to access data on disk drive 200. Each logical cluster comprises a number of physical sectors which are usually contiguous. Each FAT partition is presumed to contain a directory of files, two copies of a file allocation table, and a data area. The directory of files includes each file's name and its attributes including a starting cluster, relevant dates, etc. The file allocation table contains a linked list of clusters which comprise each file.

An operating system running out of system memory 46 stores computer files directly in a pre-allocated cluster, or when a file is too large to fit in to a single cluster, stores computer files by dividing the file into fragments and storing those fragments in separate clusters on hard disk 200. The FAT file system allows the operating system to keep track of the location and sequence of each fragment of a file, and also allows the operating system to identify which clusters are unassigned and available for new files. When computer 100 references a file, the FAT file system serves as a reference for reassembling each fragment of the file into one unit which is assembled by the file system driver.

For most users, it has been discovered that the vast majority of data stored in a computer system remains unchanged over time. Scans for undesirable or malicious code, such as virus scans, are typically being performed on a weekly basis. The scans are performed with reference to a virus definition file which is updated frequently. However, over time, the virus definition file itself consists mostly of unchanged virus identifiers such as virus signatures, code fragments, data fragments, hashes, etc. Therefore, as has been discovered, the vast majority of scanning activity is of unchanged identifiers being scanned against unchanged data. The various aspects and embodiments of the present invention aim to reduce the amount of time required to scan a computer system for undesirable code such as viruses by providing a platform by which a scanning application can securely determine which data are unchanged since a last successful scan, which is normally the majority of data, and bypassing the scan of unchanged identifiers, which are the majority of identifiers.

FIG. 2 is a simplified schematic side elevation view of a disk drive 200 having protected areas 202, read/write area 204, and integrated drive electronics 201 adapted to provide secure tracking of data references and secure data protection in accordance with a preferred embodiment of the invention. In other embodiments it will be shown that disk drive 200 is a conventional disk drive and the secure tracking and secure data protection features are provided elsewhere in the system. However, in the preferred embodiment shown in FIG. 2, since the majority of data accumulated in a computer system is unchanged relative to a last virus scan, a majority of individual disks or platters 202 are reserved for unchanged data which has been successfully scanned for malicious code. An individual disk of the disk drive, platter 204, is reserved for data which has been written since a last successful scan. Internally to drive 200, integrated drive electronics 201 maintains a cache of newly written files on platter 204 and keeps the protected platters 202 in a read-only access mode during normal operation. Externally to drive 200, integrated drive electronics 201 presents a conventional interface to the file system driver in which the entire disk drive appears to be writable. This configuration provides a platform in which (1) malicious code executing out of the operating system is unable to alter the protected data areas 202 and (2) the file's date and attribute data can be trusted. Further implementation details are to be provided as the description ensues.

Implementation details not described herein for disk drive 200 are considered to be conventional. For the most part, details concerning the construction of hard disk drives have been omitted in as much as such details are not necessary to obtain a complete understanding of the present invention.

FIG. 3 is an expanded view block diagram of integrated drive electronics 201 of disk drive 200 used in the preferred embodiment of the invention and includes other hardware which is peripheral to the integrated drive electronics. The integrated drive electronics 201 of hard disk 200 couples to system 100 through cable 308 via connectors 307 and 306. Connector 306 is integral to hard disk drive 200 whereas connector 307 forms part of cable 308. Interface 304 handles the low-level attachment interface and is implemented as a standard chip which conforms to the ATA standard and is commonly found on hard disk drives for interfacing to an EIDE controller such as disk controller 72. Although IDE drives are used in the preferred embodiment, SCSI drives and other storage devices can be used without departing from the scope of the present invention. Controller 301 handles the security and protection features of the present embodiment and functions as described herein and as shall be described with reference to the flowcharts. Controller 301 can be implemented as a microcontroller such as an H8 and is coupled to a secure memory 302. Secure memory 302 is addressable only by controller 301, and thus, a virus running under an operating system executed by system processor 42 out of system memory 46 is not able to access secure memory 302. Through I/O commands, controller 301 stores virus-scan specific variables in nonvolatile portions of secure memory 302. Additionally, controller 301 executes authentication code out of secure memory 302 to provide authentication services to an anti-virus scanning software application requesting use of the security and protection features of the preferred embodiment. In addition to the nonvolatile portions, secure memory 302 contains random access memory portions from which to execute the authentication code at a higher rate of speed than in the nonvolatile portions, and for storing temporary variables and the like. For example, as will be referred to in the description of the flowcharts, authentication is required by controller 301 in order to change the protected areas 202 from read-only to read/write modes of access.

In one embodiment, a digital signature scheme is implemented by controller 301 and secure memory 302 for the purpose of authenticating predetermined secure operations and services such as those shown in the flowcharts. The secure operations or services are requested by an application such as, for example, a virus scanner. The application is presumed to have a private key and a public key and controller 301 is presumed to be privy to the application's public key information. According to this scheme, the application requests a secure service requiring authentication from controller 301. In response, controller 301 generates a onetime (single use) random number, N1, and communicates N1 to the application. In response, the application digitally signs N1 by utilizing a Hashed Message Authentication Code (HMAC) function to combine N1 and the application's private key to produce a corresponding onetime password, P1. SHA-1 is used as the secure hashing method and is presently believed to be immune from dictionary attacks. The application then communicates P1 to controller 301. In response, controller 301 decrypts P1 given knowledge of the predetermined and agreed-to SHA-1 HMAC and the application's public key to verify the authenticity of password P1. If verified, the application is given access to the secure resource being requested.

Other authentication techniques can be used. In one embodiment, hardware assisted digital signature techniques are used. The public key would be known to controller 301 on disk drive 200 (or in other locations as described in other embodiments), and the private key kept some place secure, such as in a TCG TPM or a Smart Card. For readers interested in TPM specifics, the *TCG TPM Specification Version* 1.2 can be found on the Internet at www.trustedcomputinggroup.org. Authentication to the TPM or smart card could then be done via a secure path or biometric such as a retinal eye scan or fingerprint recognition subsystem, thus producing the authorization required.

Figure 13:
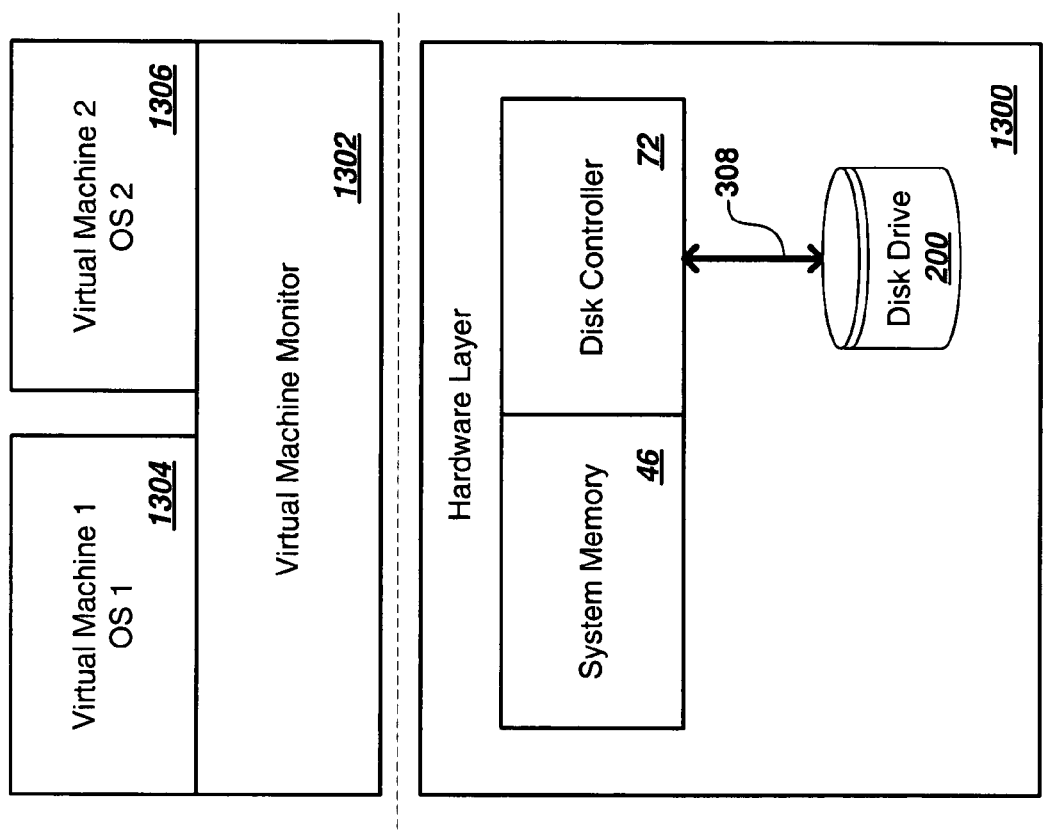
FIG. 13 is a system virtualization layer diagram showing the abstraction layers in a computer system running virtualization software according to one embodiment of the present invention in which a virtual machine monitor is employed to implement the secure memory and other protective functions in lieu of a hardware-implemented controller.

Similarly, for the virtual machine monitor embodiment shown in FIG. 13 in which the function of controller 301 is embedded in the virtual machine monitor, authentication could be done by having the virtual machine monitor take control of the keyboard and screen (not shown in FIG. 13) and either directly run an application that allows for password authentication or provide a secure virtual machine in which such an application would run. Again, this password would likely not be passed directly to the hardware controller, but rather be used together with a random number to provide additional protection against dictionary attacks.

In one embodiment, a direct path from an authentication media to the hardware that is providing authentication verification could provide a secure "trusted path" in which to enter a straight password, immune to a virus. In this embodiment, something as simple as a button could be used instead of a password, as a virus would have no way to physically "push" the button.

In one embodiment, where simplicity is desired, a simple password could be used and would work. However, a scheme as simple as a straight password could be cracked by a specially designed virus or Trojan that listens for just such an authentication. Nevertheless, a straight password does provide a minimum level of security and can be executed immediately after a virus scan to minimize risk.

The platform avails trust from references to the secure memory 302 which is unreachable by malicious code, either by reference to the secure memory in the form of the executing the authentication code, or by reference to stored variables such as timestamps, file or cluster attributes, and the like, which are stored in the secure memory 302.

In an alternative embodiment, where a secure memory is not available, trusted variables such as timestamps and the like are stored in an insecure memory (not shown) in encrypted form. While this approach may not be as secure as using memory that is truly inaccessible, it provides a minimal level of functionality. Scanning programs which rely on the trusted variables are able to access the insecure memory of this embodiment and obtain the trusted variables and determine their authenticity using standard decryption techniques. To the extent that the cryptography provides security, the content of the variables are unavailable to malicious code. In the case that malicious code tramples upon the trusted variables stored in the insecure memory of this embodiment, standard decryption techniques allow for detection of such trampling. If foul play is detected by the scanning program upon decrypting the trusted variables, the acceleration techniques described herein are bypassed and the scanning for malicious code is performed for all files stored on the disk drive.

Returning now to the description of the embodiment shown in FIG. 3, Controller 301 interfaces to low-level circuitry 305 in the same manner as ATA interface 304 would in the absence of controller 301. Low-level drive circuitry 305 controls low-level disk drive functions including spindle motor start up and rotational speed, actuator movement, error correction, and read and write current to protected platters 202 and read/write platter 204 including head current and bit encoding protocol.

In one embodiment, the nonvolatile portions of secure memory 302 or sub-portions thereof can be implemented as a protected sector or track on the hard drive itself.

Figure 4:
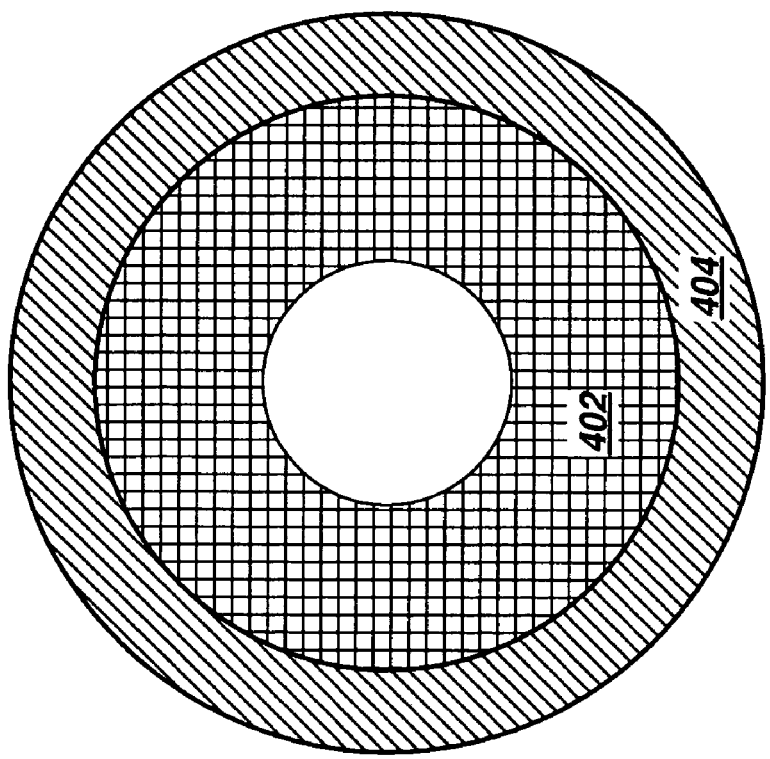
FIG. 4 is a plan view of an individual disk drive platter according to one embodiment of the present invention having an alternative layout for the protected areas and read/write areas.

FIG. 4 is a plan view of an individual disk drive platter according to one embodiment of the present invention having an alternative layout for the protected areas and read/write areas. In the embodiment shown in FIG. 4, rather than dividing the protected and read/write areas as separate platters, the surface of any one of the individual disks or all of the disks can be divided into protected areas 402 and read/write areas 404. Files which have been written since a last successful scan are cached to the outer read/write tracks 404. Files which were successfully scanned in a last scan are maintained in the inner protected tracks 402.

Figure 5:
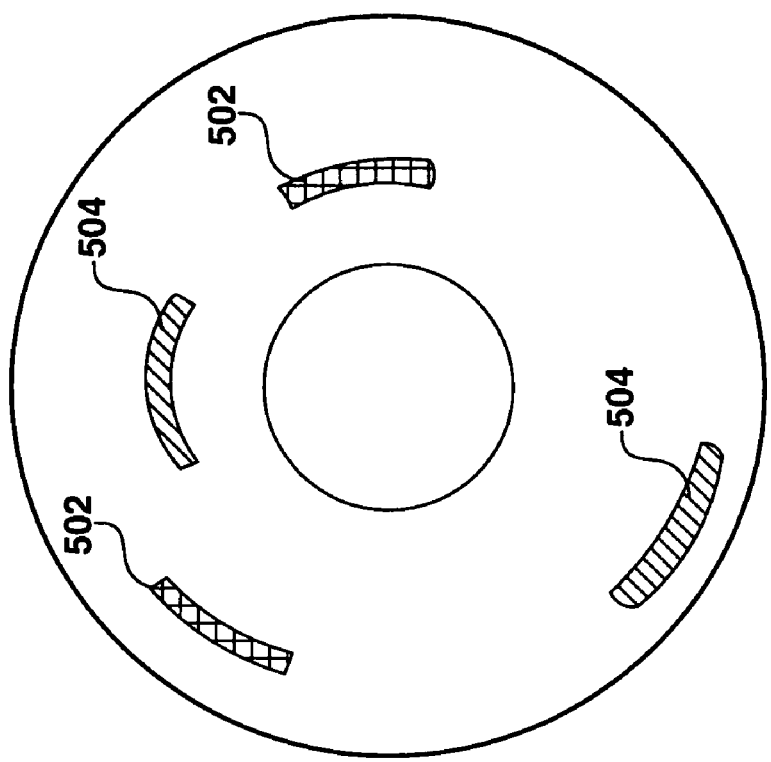
FIG. 5 is a plan view of an individual disk drive platter according to one embodiment of the present invention having an alternative layout for the protected areas and read/write areas.

FIG. 5 is a plan view of an individual disk drive platter according to one embodiment of the present invention having an alternative layout for the protected areas and read/write areas. In the embodiment shown in FIG. 5, rather than dividing the protected and read/write areas as separate platters or separate tracks, protected areas 502 and read/write areas 504 can be tracked (accounted for) logically by controller 301 by maintaining a table in secure memory 302. Thus, the division between protected and read/write areas need not be physical nor contiguous as in other embodiments. The areas tracked by controller 301 can be clusters (logical) or sectors (physical) or groups of clusters or groups of sectors or even individual tracks. Tracking clusters, however, is most convenient since the directory on the disk is maintained as clusters and the nonvolatile portions of the table used to track the areas, which would normally be implemented in secure memory 302, can be included in the directory on the hard disk itself. In like fashion to other embodiments, the determination as to which files have changed avails trust from referencing the table maintained in secure memory 302 which is inaccessible by a virus executed from the operating system under the control of main processor 42.

Controller 301 and secure memory 302, in effect, form a security subsystem platform by which an anti-virus scanning application is able to trustfully determine anti-virus parameters in order to improve the efficiency of anti-virus scans.

Since anti-virus programs work on the level of files and not of clusters, and since the file system driver of the operating system writes clusters and not files per se, controller 301 correlates clusters to filenames for clusters that have been written since the last successful scan. This is done by referencing the directory and file allocation table on the hard disk partition for each cluster being written by the file system driver to obtain the corresponding filename for the files which are cached in the staging read/write area 204. As will be described in further detail, these files stored in the read/write area 204 will eventually be moved, to or converted into, a portion of the protected area once they have been successfully scanned for malicious code.

In one embodiment, as an alternative to caching, the entire disk can remain in read/write mode. In this embodiment, controller 301 and secure memory 302 act to securely track which areas of the hard disk have changed since the last virus scan by maintaining a list of written clusters in secure memory 302. The list of files which have changed since last virus scan can then be derived for the anti-virus software from the directory as described above. This embodiment provides a reduced level of security relative to cached embodiments having protected areas.

Figure 6:
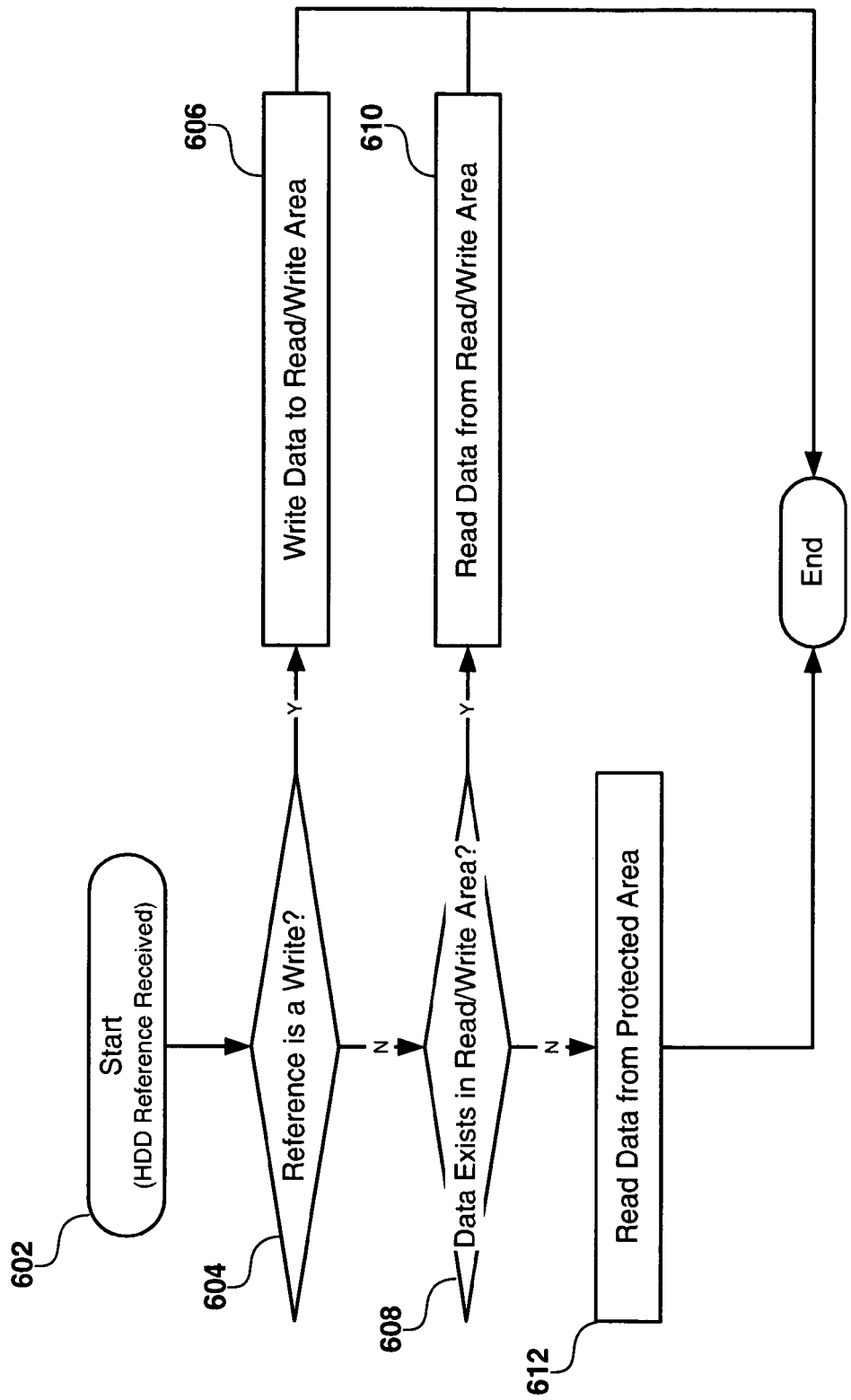
FIG. 6 is a flow diagram of the logic which caches data in the read/write area while operating in a normal mode where modification to the protected area is not taking place.

FIG. 6 is a flow diagram of the logic which caches data in the read/write area while operating in a normal mode where modification to the protected area is not taking place. The logic shown in FIG. 6 is implemented in controller 301 of FIG. 3. The caching process begins 602 when a reference to the hard disk drive is received from the file system driver of the operating system. A first query is made to determine 604 whether the reference is a write reference or a read reference. If a determination 604 is made that the reference is a write reference, the data is written 606 to the read/write area 204. If 604 the reference is a read reference, a second determination 608 is made as to whether the data exists in the read/write area 204. If it is determined 608 that the data exists in the read/write area, the data is read 610 from the read/write area 204. Else, if it is determined 608 that the data does not exist in the read/write area 204, the data is read from protected area 202.

Figure 7:
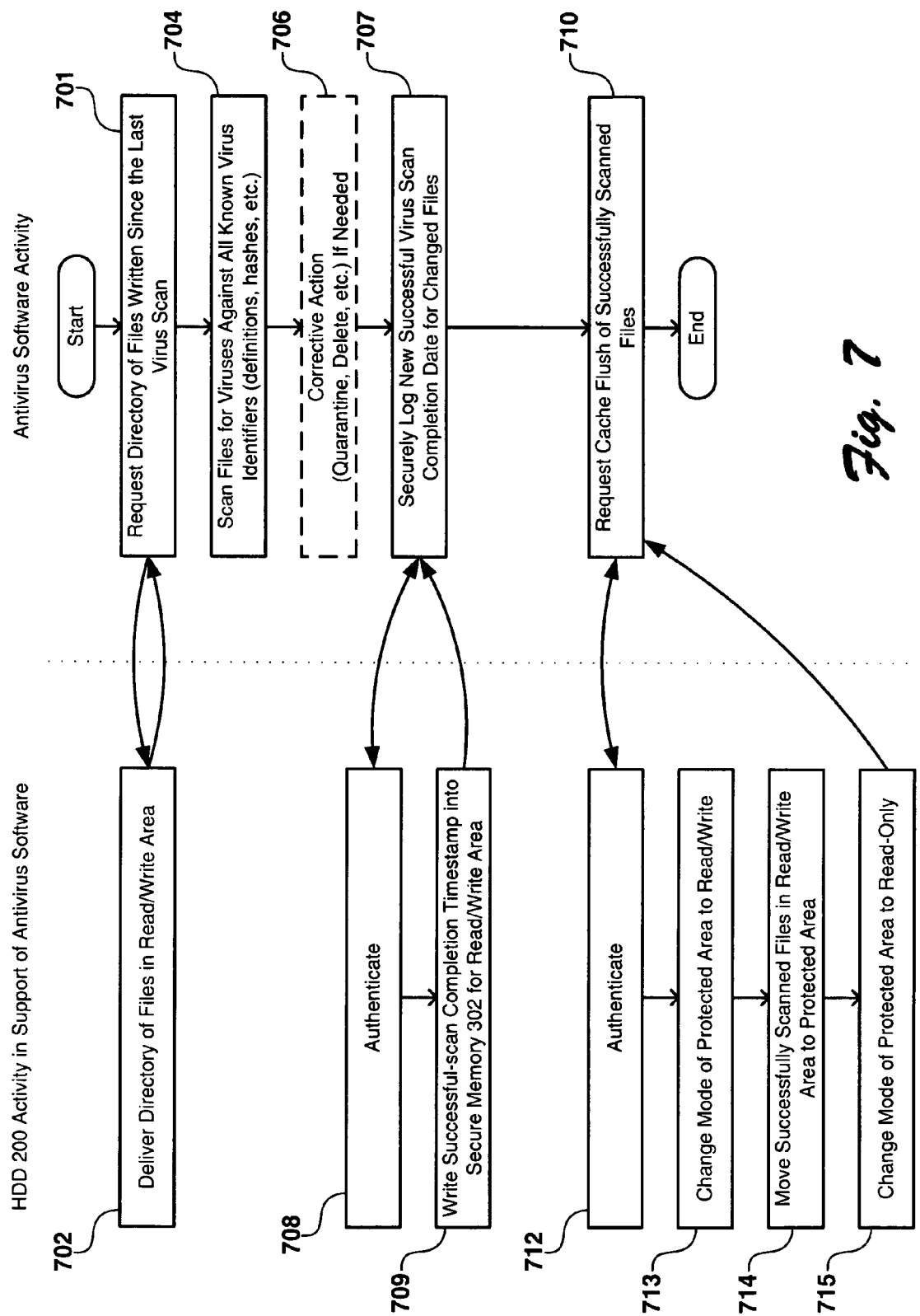
FIG. 7 is a flow diagram depicting the logic for scanning all files that have been written since a last virus scan according to one embodiment of the present invention.

FIG. 7 is a flow diagram depicting the logic for scanning all files that have been written since a last virus scan according to one embodiment of the present invention. The processes shown to the right of the dotted line in FIG. 7 are performed by anti-virus software during the process of scanning files in read/write area 204. The processes shown to the left of the dotted line are performed by controller 301 of integrated drive electronics 201 of hard disk drive 200 in response to the actions taken by the anti-virus software application. The same convention is used for FIGS. 8 and 9, i.e., application actions to the right and controller 301 responses on the left. The anti-virus software first requests 701 a directory of files written since last virus scan. In response, controller 301 delivers 702 a directory of files in the read/write area 204. The anti-virus software then scans 704 each file for viruses against all known virus identifiers. Identifiers or signatures of malicious code normally take the form of a hash but can take other forms including a code fragment, a data fragment, and a registry entry for scanning the registry of the operating system. Corrective action 706 is then taken if a virus is found in read/write area 204. After successful completion of the virus scan, the anti-virus software then securely logs 707 a new successful virus scan completion date for the files in read/write area 204. Since the request to securely log the new successful virus scan completion date involves a write to secure memory 302, controller 301 initially responds to such request with authentication procedure 708. Authentication procedure 708 can be any of the authentication procedures previously described herein.

If the authentication 708 is successful, controller 301 writes 709 a timestamp into secure memory 302 for read/write area 204. This timestamp represents the time when the last successful virus scan was completed and is later used to minimize further scanning on subsequent scans. Next, the anti-virus software requests 710 a cache flush of the successfully scanned files. In response to request 710, controller 301 executes the authentication 712 routine. If authentication 712 is successful, the access mode of protected areas 202 are changed 713 to read/write mode and the files from the read/write area 204 are moved 714 into the protected area. As a part of the move process, the successfully scanned files are deleted from the read-write area 204 after successfully writing the scanned files to the protected areas 202. The access mode of protected areas 202 is then changed 715 to read-only access mode and an acknowledge is returned to the anti-virus software. Thus, a large number of identifiers, all identifiers, are scanned against a minority of files, only those files which have changed since last scan.

Figure 8:
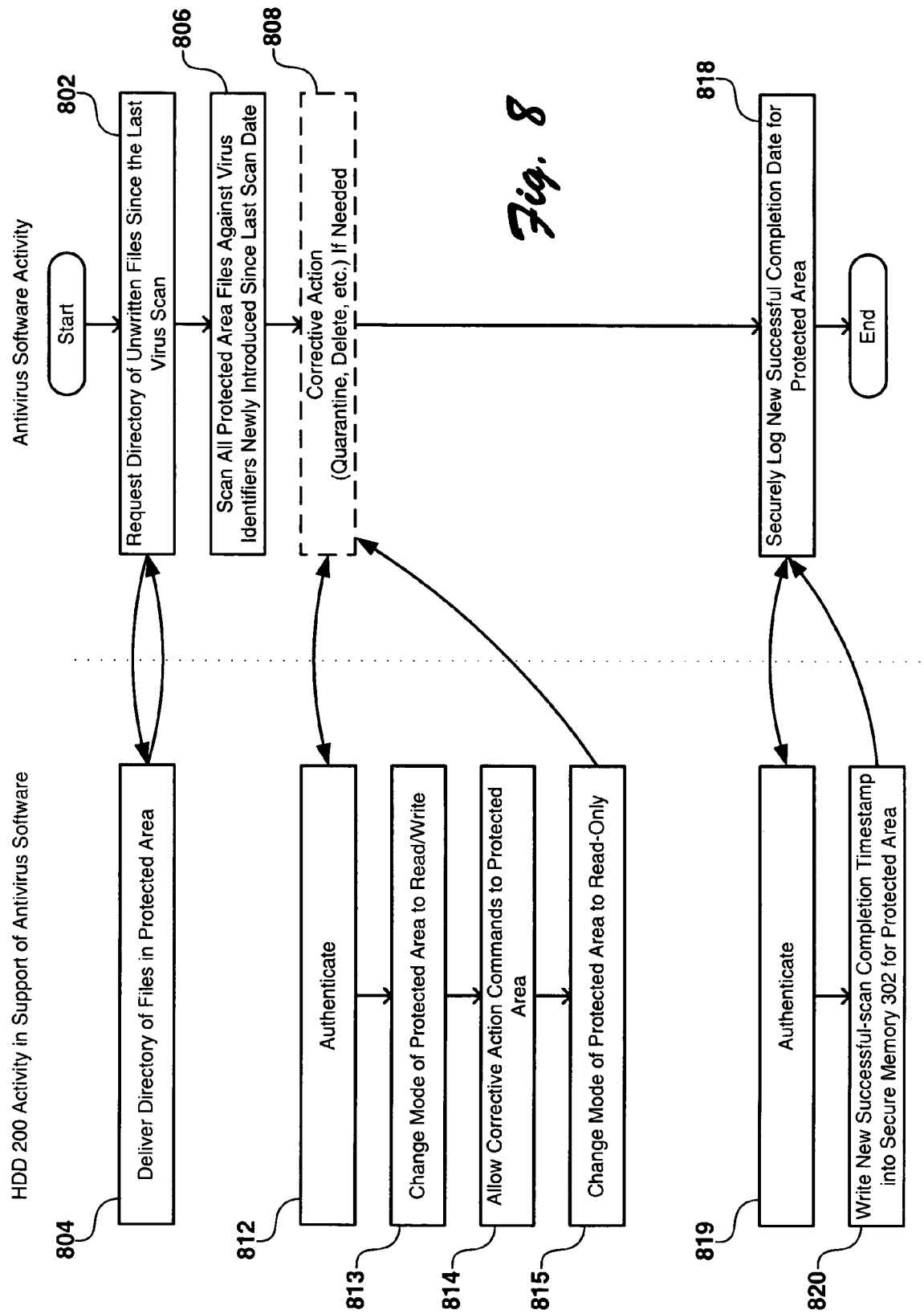
FIG. 8 is a flow diagram depicting the logic for scanning unchanged files in the protected area according to one embodiment of the present invention.

FIG. 8 is a flow diagram depicting the logic for scanning unchanged files in the protected area according to one embodiment of the present invention. The anti-virus software initially requests 802 a directory of files which have not been written-to since the last virus scan. In response, controller 301 returns 804 a directory of files in protected areas 202. These files need not be scanned against identifiers which were included in a prior scan. Thus, the anti-virus software scans 806 all of the files in protected areas 202 against only newly introduced identifiers which were not included in a prior scan. These new identifiers are typically downloaded from the Internet on a weekly basis and represent a minority of the set of identifiers in the virus definition file. If corrective action 808 is needed, as in for example if a virus is found, the corrective action 808 needs to occur relative to data on the protected area 202 which under the normal mode of operation is set to a read-only mode. Thus, to take corrective action 808, it is necessary to change the protected area 202 to a writable mode. Thus, if corrective action 808 is needed, the anti-virus software authenticates 812 the access mode change operation and if the authentication 812 succeeds, the protected areas 202 are changed 813 to a read/write mode. Controller 301 then allows 814 corrective action 808 to be taken in protected areas 202. Following the corrective action, controller 301 changes 815 the access mode of protected areas 202 back to the read-only access mode. Once the virus scans are complete and successful, the anti-virus software then securely logs 818 the new successful completion date for the protected areas 202 by requesting such log from the security subsystem. Upon receiving such request, controller 301 invokes the authentication 819 routine and if successful writes 820 a successful scan completion timestamp into the secure memory 302 for the protected areas 202. It is this timestamp that is referenced during scan 806 in determining which identifiers have been newly introduced since the last scan date. The determination can be trusted because the timestamp is stored in secure memory 302 which is only accessible by controller 301 and which is inaccessible by malicious code executed under the operating system by system processor 42. After the timestamp is successfully written to secure memory 302, an acknowledge is sent to the anti-virus software. Thus, a small number of identifiers, only those identifiers which have been newly downloaded since the last scan (as verified by the timestamp), are scanned against the majority of files, the unchanged files residing in protected areas 202.

Figure 9:
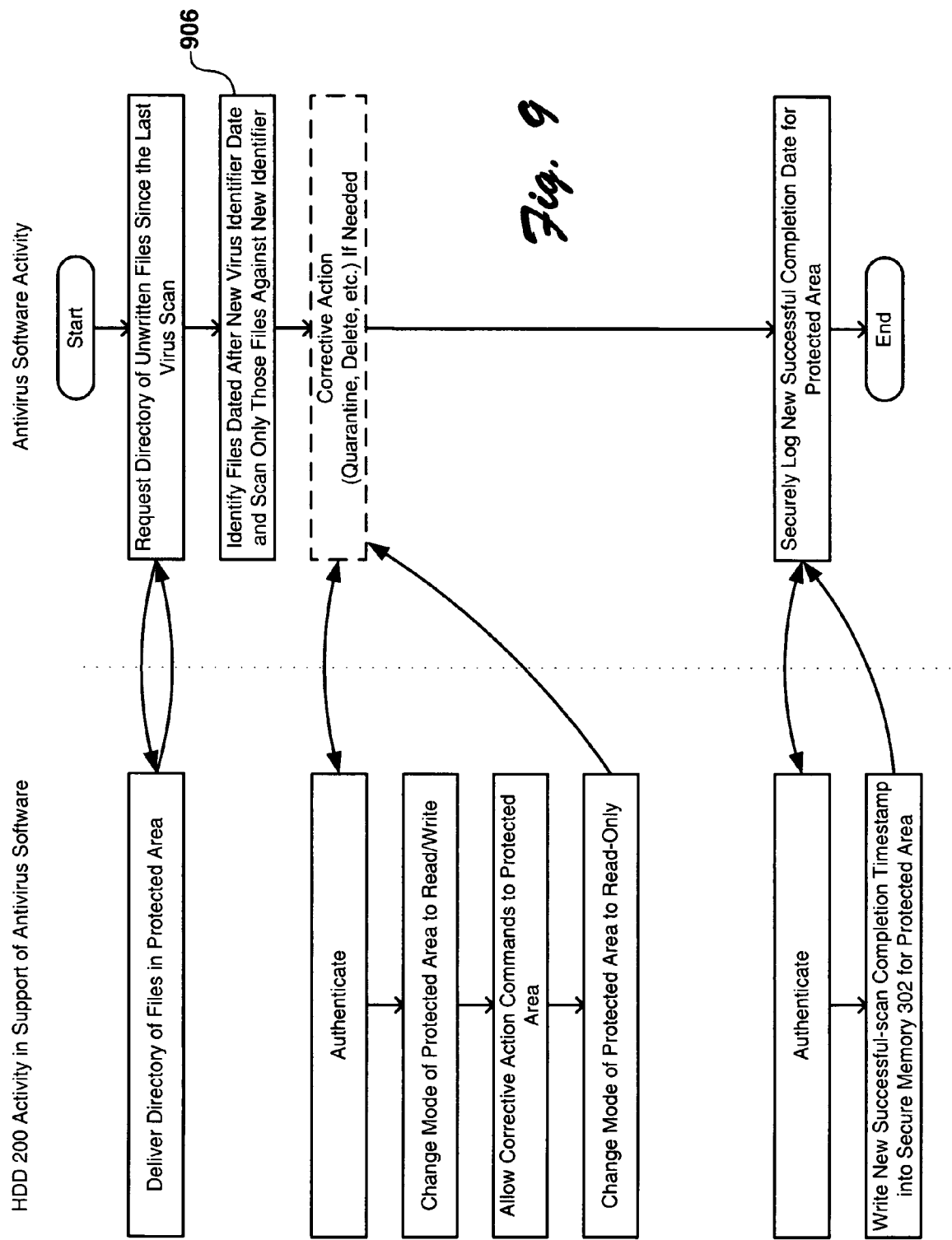
FIG. 9 is a flow diagram depicting the logic for scanning a subset of the unchanged files in the protected area according to one embodiment of the present invention.

FIG. 9 is a flow diagram depicting the logic for scanning a subset of the unchanged files in the protected area according to one embodiment of the present invention. This embodiment is similar to that of FIG. 8 and allows for scanning fewer than all files in the protected area when new identifiers are downloaded. This is accomplished by identifying 906 which files in protected areas 202 are newer than the date in which a virus is known to have come into existence. Thus, the identifiers, when downloaded from the internet, would contain such first-known-date information if applicable. The files dates of the files in the protected areas 202 can be trusted since the protected areas are maintained in a read-only access mode during normal operation and can only be altered through authenticated procedures. The anti-virus software can then compare the first known date of the virus with the modification date of the files and scan only those files which have been created or modified after the first known date of the virus.

For the embodiments of FIGS. 7, 8, and 9, although code executing out of the operating system does have read access to protected areas 202, it is not inconsistent with the inventive concepts described herein to consider protected areas 202 as part of the security subsystem because protected areas 202 are not normally accessible for writing. These areas are only available for writing immediately after the anti-virus scan has completed and the anti-virus software has determined that no known virus is actively running in the system. Thus, for the example given in FIG. 9, the identification 906 of file dates can be performed by reading the protected areas 202 directly by the anti-virus software to determine the dates. These dates can be trusted because write access to protected areas 202 is not normally given to code executing out of the operating system.

FIG. 10 is a table 1002 of timestamp entries, one for each of the read/write and protected areas, according to the preferred embodiment of the present invention in which timestamps are stored in secure memory 302 after each successful run of a virus scan in each respective area. Area 0 corresponds to protected areas 202. Area 1 corresponds to read/write area 204. These timestamps are maintained so that anti-virus software can securely determine which identifiers are to be used for scanning in each respective area. Note that the file dates of files stored in the read/write area 204 cannot be trusted. Thus, the timestamp which corresponds to the read/write area 204 represents the last time the cached staging area was flushed into the protected areas 202. All files stored in read/write area 204 are scanned against all known identifiers as shown in FIG. 7.

FIG. 11 is a block diagram of one embodiment according to the present invention in which the controller and the secure memory are located in disk controller 72 rather than in hard disk 200 itself. In this embodiment, therefore, disk drive 200 is of entirely conventional construction. Protected areas 202 and read/write area 204 are logically maintained by controller 1101 in this embodiment. Controller 1101 of this embodiment functions as per controller 301 in the embodiments described above relative to maintaining the areas 202 and 204 and in responding to anti-virus software requests and queries. Otherwise, the I/O interfaces and protocols for controller 1101 differ from controller 301 described above due to its location. Secure memory 1102 is inaccessible to code executed under the operating system and thus avails trusted to the embodiment of FIG. 11 in a manner analogous to secure memory 302 in the embodiments described above.

FIG. 12 is a block diagram of one embodiment according to the present invention in which a controller 1201 and a secure memory 1202 are built-in to IDE cable 308. Thus, the security subsystem can be located throughout the system without departing from the spirit of the invention. Indeed, the controller and the secure memory components of the security subsystem need not be located on the same subassembly.

FIG. 13 is a system virtualization layer diagram showing the abstraction layers in a computer system running virtualization software according to one embodiment of the present invention in which a virtual machine monitor is employed to implement the secure memory and other protective functions in lieu of a hardware-implemented controller. According to this embodiment, specialized hardware is not required. At the lowest level of abstraction is the hardware layer 1300; this is the physical hardware layer of the computer system. A Virtual Machine Monitor layer 1302 is an intermediary layer which sits on top of the hardware layer 1300 and intercepts all access attempts to system memory 46 and disk controller 72 by software running on the computer system. It is within the Virtual Machine Monitor layer 1302 that the functions of controller 301, according to any of the embodiments described, are executed as part of the virtual machine monitor itself. As such, the computer system avails of all the security and isolation features that virtual machine monitors offer. At the highest level of abstraction lie the virtual machines 1304 and 1306 which ultimately run operating systems and software applications. Virtual machines are configured so as to not know of the existence of other virtual machines. Likewise, system memory 46 is virtualized by virtual machine monitor 1302 so as to allocate a secure memory which is not directly accessible by code executed from any operating system; this virtual secure memory functions analogously to secure memory 302 while the system is powered on. Thus, a virus executing out of OS-1 in Virtual Machine-1 1304, for example, will not be able to tamper with the authentication procedure or have access to the trusted variables. While the machine is powered off, secure variables, authentication code, and the like, must be securely stored in any nonvolatile memory using any of the known methods of saving and restoring encrypted data to an insecure nonvolatile memory. Thus, the inventive concepts described herein are not limited to hardware implementations.

Figure 14:
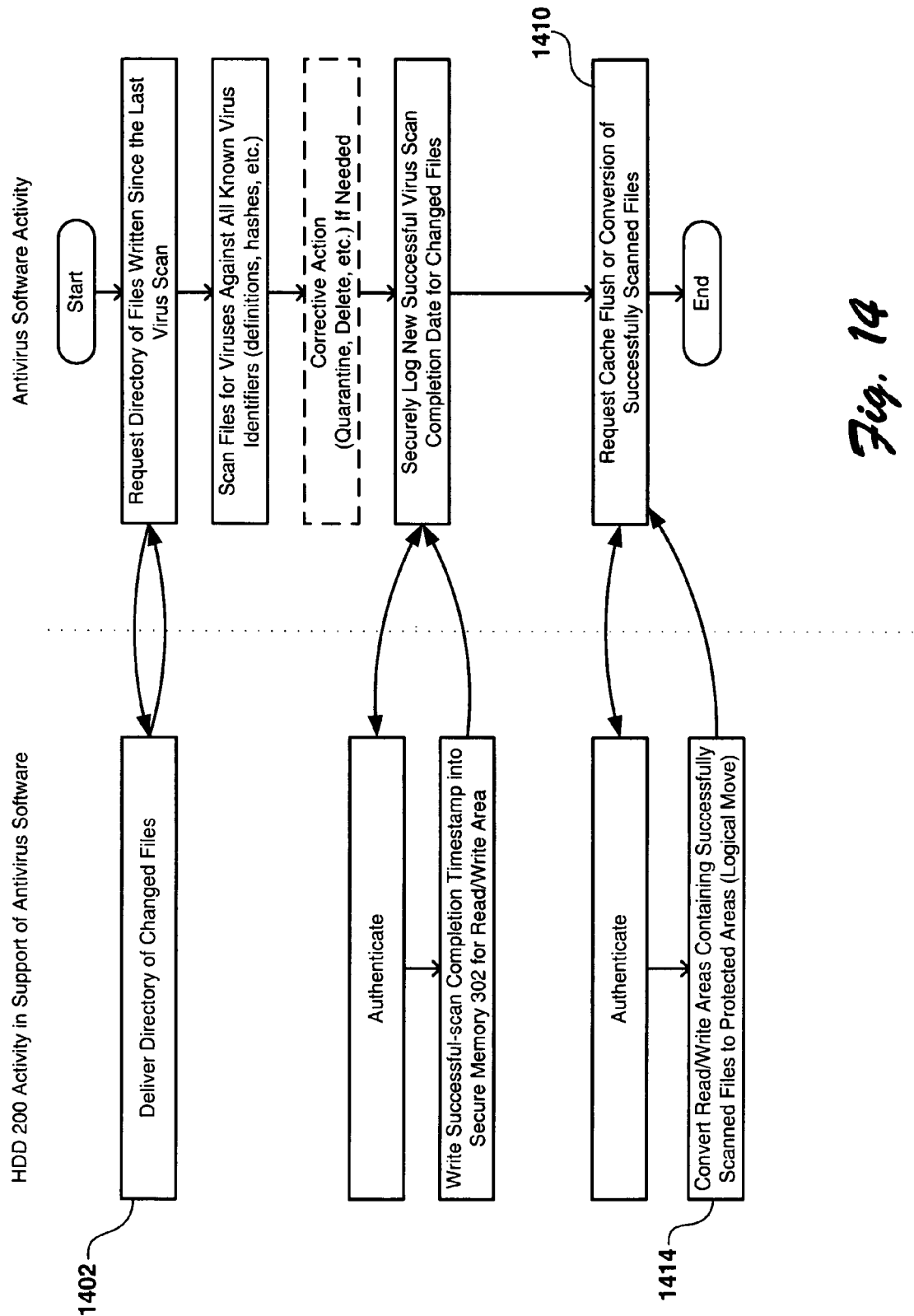
FIG. 14 is a flow diagram depicting the logic for scanning all files that have been written since a last virus scan according to one embodiment of the present invention in which the movement of files from the read/write area to the protected area are performed logically rather than physically.

FIG. 14 is a flow diagram depicting the logic for scanning all files that have been written since a last virus scan according to one embodiment of the present invention in which the movement of files from the read/write area to the protected area are performed logically rather than physically. This embodiment is best implemented with the protected and read/write areas configured logically as shown in FIG. 5. Rather than caching data in a read/write area and flushing the cache to a protected area, this embodiment securely converts protected areas to read/write areas and read/write areas to protected areas as needed. Except where noted below, the process shown in FIG. 14 is similar to the process shown in FIG. 7. The anti-virus software first requests a directory of files written since last virus scan. In response, controller 301 delivers 1402 a directory of files which have changed. This will be the directory of files in the read/write areas 504 as shown in FIG. 5. In this embodiment, the anti-virus software need not have specific knowledge as to whether the files are moved logically for physically from the read/write areas to the protected areas. The request 1410 can be for a cache flush or for the conversion of successfully scanned files. In response to request 1410, controller 301 executes the authentication routine. If authentication is successful, the successfully scanned files in read/write areas 504 are converted 1414, or appended onto, the logical protected areas 502. An acknowledge is then returned to the anti-virus software. Allocation of disk space between the two areas is dynamic and it is therefore less likely that any one area will run out of space. When new files are added to the protected areas 502, their storage locations are added to the table that defines the "logical" protected region 502. To prevent unbounded growth of the protected area 502, previous copies (i.e., copies currently residing in the protected area) of any newly added files to the protected area can be deleted from the logical protected area and added to the logical "read-write" area, and optionally marked as empty or erased. Utilizing this process, like the process shown in FIG. 7, a large number of identifiers, all identifiers, are scanned against a minority of files, only those files which have changed since last scan.

The embodiment shown in FIG. 14 can be implemented as a virtual machine manager as described in relation to FIG. 13.

Other embodiments are possible in which the writing or the conversion to the protected areas occur after the areas to be scanned are first put into a read-only state. Alternatively, the areas to be scanned can be first moved to a read-only staging area such that, once scanned, the files would not fall under attack from a virus executing between the time the files are scanned and when they are written or converted. This alternative embodiment, however, occupies more disk space than other embodiments presented. These embodiments are also considered to fall within the scope of the present invention.

An embodiment of the present invention may be provided as a computer program product which may include a machine-readable medium having stored thereon instructions which may be used to program a computer (or other electronic devices) to perform a process according to the any of the embodiments of the present invention. The machine-readable medium may include, but is not limited to, floppy diskettes, optical disks, CD-ROMs, and magneto-optical disks, ROMs, RAMs, EPROMs, EEPROMs, magnet or optical cards, or other type of media/machine-readable medium suitable for storing electronic instructions. Moreover, an embodiment of the present invention may also be downloaded as a computer program product, wherein the program may be transferred from a remote computer to a requesting computer by way of data signals embodied in a carrier wave or other propagation medium via a communication link (e.g., a modem or network connection).

The order of steps given herein is for exemplary purposes only and should not be interpreted as limiting with respect to other embodiments which are possible using a different order of steps in implementing the inventive concepts described herein. Any ordering of steps in the claims are for the purpose of improving clarity and do not imply any particular order of steps to be taken.

In the drawings and specifications there has been set forth a preferred embodiment of the invention and, although specific terms are used, the description thus given uses terminology in a generic and descriptive sense only and not for purposes of limitation.

We claim as our invention:

1. A method comprising:
   storing trusted variables that pertain to prior scans for identifiers of undesirable code in a secure memory of a security subsystem, the secure memory being inaccessible to code executed by an operating system, the trusted variables comprising:
   a directory of files written to since a last scan; and
   a directory of files that have not been written to since the last scan; and
   accelerating a scan for identifiers of undesirable code by utilizing the trusted variables to reduce a number of files to be scanned and/or reduce a number of undesirable code identifiers used for scanning;
   wherein files written to since the last scan are scanned against all known identifiers of undesirable code; and wherein files that have not been written to since the last scan are scanned only against newly introduced identifiers of undesirable code.

2. The method according to claim 1, wherein the trusted variables further comprise a trusted scan timestamp; and
wherein the newly introduced identifiers of undesirable code are determined relative to the trusted scan timestamp stored in the secure memory.

3. The method according to claim 1, wherein the files that have been written to since the last scan reside in a read/write area of a storage device; and
wherein the files that have not been written to since the last scan reside in a first area of a storage device; and
wherein the files in the first area are bypassed in a subsequent scan in response to a determination that:
the first area has not been written to since a prior scan; and
the files in the first area have been scanned in a prior scan against all known identifiers of undesirable code;
the files in the first area that are bypassed resulting in a bypassed area.

4. The method according to claim 3, further comprising:
requesting from the security subsystem a trusted scan timestamp of when the last scan was executed and which is trusted by virtue of the secure memory; and
scanning the bypassed area against a newly introduced identifier which is associated with malicious code known to have come into existence on a new identifier date, wherein the scanning of the bypassed area occurs in response to a determination that a new identifier timestamp, which is related to the new identifier date, is earlier than the trusted scan timestamp; and wherein the bypassed area is not scanned for other known identifiers of malicious code that were included in the last scan.

5. The method according to claim 3, wherein the first area is securely configurable between a normal read-only state and a writeable state, the configuration being under the control of the security system.

6. The method according to claim 5, further comprising:
upon successfully scanning the files in the read/write area, activating and authenticating a first security measure of the security system to configure the first area to the writeable state, wherein the authentication executes out of the secure memory;
writing the successfully scanned files in the read/write area to the first area; and
configuring the first area to a read-only state after the writing of successfully scanned files.

7. The method according to claim 6, wherein the authentication for the first security measure is an authentication selected from the group consisting of a password, a digital signature, and a biometric.

8. The method according to claim 7, wherein the read/write area and first area are subdivided logically and are located on a single storage device.

9. The method according to claim 7, wherein the read/write area and first area are subdivided physically.

10. The method according to claim 9, wherein the physically subdivided areas are respectively contiguous areas on the storage device.

11. The method according to claim 6, wherein the authentication of the first security measure is executed under control of a virtual machine monitor.

12. The method according to claim 1, wherein the newly introduced identifiers of undesirable code and the all known identifiers of undesirable code comprise identifiers of malicious code.

13. The method according to claim 12, wherein the identifiers of malicious code are selected from the group consisting of a signature, a code fragment, a data fragment, a hash, and a registry entry in a registry of the operating system.

14. The method according to claim 1, wherein the security subsystem is implemented in hardware such that the secure memory is additionally inaccessible to a main processor that executes the operating system, wherein the hardware is physically located at a location selected from the group consisting of a storage controller, and a storage device cable.

15. A method comprising:
storing trusted variables that pertain to prior scans for identifiers of undesirable code in a secure memory of a security subsystem, the secure memory being inaccessible to code executed by an operating system, the trusted variables comprising:
a trusted scan timestamp; and
accelerating a scan for identifiers of undesirable code by utilizing the trusted variables to reduce a number of files to be scanned and/or reduce a number of undesirable code identifiers used for scanning;
wherein files that have not been written to since the last scan are scanned only against newly introduced identifiers of undesirable code; and
wherein the newly introduced identifiers of undesirable code are determined relative to the trusted scan timestamp stored in the secure memory.

16. An apparatus comprising:
a processor; and
a main memory that stores code which is executed under an operating system by the processor;
a security subsystem having a secure memory which is inaccessible to the code which is executed under the operating system by said processor, the secure memory storing trusted variables that pertain to prior scans for undesirable code, the trusted variables comprising:
a directory of files of a storage device written to since a last scan; and
a directory of files of the storage device that have not been written to since the last scan;
wherein the storage device is operatively coupled to said processor and said security subsystem and is subdivided into a first area and a read/write area, the first area being securely configurable under the control of said security system between a normal read-only state and a writeable state;
wherein the security system is configured to accelerate a scan for identifiers of undesirable code by utilizing the trusted variables to reduce a number of files to be scanned and/or to reduce a number of identifiers of undesirable code to be used for scanning;
wherein files written to since the last scan are stored in the read/write area, whereby the files written to since the last scan are scanned against all known identifiers of undesirable code; and
wherein files that have not been written to since a last scan are stored in the first area, whereby the files that have not been written to since the last scan are scanned only against newly introduced identifiers of undesirable code.

17. The apparatus according to claim 16, wherein said security subsystem is configured to invoke an authentication procedure in response to a provided request to configure the first area to the writeable state to write files from the read/write area to the first area after the files in the read/write area have been successfully scanned for all known identifiers; and
wherein the authentication executes out of the secure memory.

18. The apparatus according to claim 17, wherein said security system is implemented as a virtual machine monitor.

19. The apparatus according to claim 17, wherein the security system is implemented in hardware such that the secure memory is additionally inaccessible to said processor and wherein the hardware is physically located at a location selected from the group consisting of a storage controller, and a storage device cable.

20. The apparatus according to claim 17, wherein the first area and read/write area are subdivided logically and are located on a single storage device.

21. The apparatus according to claim 17, wherein the first area and read/write area are subdivided physically.

22. The apparatus according to claim 21, wherein the physically subdivided areas are respectively contiguous areas on the storage device.

23. A method comprising:
subdividing a storage device into a first area and a read/write area, the first area being securely configurable between a normal read-only access mode and a writeable access mode, wherein the storage device imposes a security measure in response to an attempt to configure the mode of access to the first area;
caching accesses to the storage device by:
directing read accesses to the read/write area if the data being accessed is in the read/write area;
directing read accesses to the first area if the data being accessed is missing from the read/write area;
directing write accesses to the read/write area;
storing trusted variables that pertain to prior scans for identifiers of undesirable code in a secure memory of a security subsystem, the secure memory being inaccessible to code executed by an operating system, the trusted variables comprising:
a trusted scan timestamp;
accelerating a scan for identifiers of undesirable code by utilizing the trusted variables to reduce a number of files to be scanned and/or reduce a number of identifiers of undesirable code used for scanning, wherein the accelerating further comprises:
scanning files in the read/write area for all known identifiers of undesirable code; and
scanning files in the first area only for newly introduced identifiers of undesirable code, wherein the newly introduced identifiers of undesirable code are determined relative to the trusted scan timestamp;
upon successfully scanning the files in the read/write area, activating a first security measure on the storage device to configure the first area in the writeable access mode;
writing successfully scanned files in the read/write area to the first area; and
activating a second security measure on the storage device to configure the first area in the read-only access mode.

24. A method comprising:
subdividing a storage device into a first area and a read/write area, the first area being securely configurable between a normal read-only access mode and a writeable access mode, wherein the storage device imposes a security measure in response to an attempt to configure the mode of access to the first area;
caching accesses to the storage device by:
directing read accesses to the read/write area if the data being accessed is in the read/write area;
directing read accesses to the first area if the data being accessed is missing from the read/write area;
directing write accesses to the read/write area;
storing trusted variables that pertain to prior scans for identifiers of undesirable code in a secure memory of a security subsystem, the secure memory being inaccessible to code executed by an operating system, the trusted variables comprising:
a directory of files in the read/write area; and
a directory of files in the first area;
accelerating a scan for identifiers of undesirable code by utilizing the trusted variables to reduce a number of files to be scanned and/or reduce a number of identifiers of undesirable code used for scanning, wherein the accelerating further comprises:
scanning files in the read/write area for all known identifiers of undesirable code; and
scanning files in the first area only for newly introduced identifiers of undesirable code;
upon successfully scanning the files in the read/write area, activating a first security measure on the storage device to configure the first area in the writeable access mode;
writing successfully scanned files in the read/write area to the first area;
activating a second security measure on the storage device to configure the first area in the read-only access mode; and
deleting the successfully scanned files from the read/write area.

25. The method according to claim 24, wherein the trusted variables further comprise a trusted scan timestamp; and
wherein the newly introduced identifiers of undesirable code are determined relative to the trusted scan timestamp stored in the secure memory.

26. A product comprising:
a tangible computer usable medium having computer readable program code stored therein, the computer readable program code in said product being effective to:
subdivide a storage device into a first area and a read/write area, the first area being securely configurable between a normal read-only access mode and a writeable access mode, wherein the storage device imposes a security measure in response to an attempt to configure the mode of access to the first area;
cache accesses to the storage device by:
directing read accesses to the read/write area if the data being accessed is in the read/write area;
directing read accesses to the first area if the data being accessed is missing from the read/write area;
directing write accesses to the read/write area;
store trusted variables that pertain to prior scans for identifiers of undesirable code in a secure memory of the security system, the secure memory being inaccessible to code executed by an operating system, the trusted variables comprising:
a directory of files in the read/write area; and
a directory of files in the first area;
accelerate a scan for identifiers of undesirable code by utilizing the trusted variables to reduce a number of files to be scanned and/or reduce a number of identifiers of undesirable code used for scanning, wherein the scan is accelerated via:
scanning files in the read/write area for all known identifiers of undesirable code; and
scanning files in the first area only for newly introduced identifiers of undesirable code;
upon successfully scanning the files in the read/write area, activate a first security measure on the storage device to configure the first area in the writeable access mode;

write successfully scanned files in the read/write area to the first area;
activate a second security measure on the storage device to configure the first area in the read-only access mode; and
delete the successfully scanned files from the read/write area.

27. A product comprising:
a tangible computer usable medium having computer readable program code stored therein, the computer readable program code in said product being effective to:
store trusted variables that pertain to prior scans for identifiers of undesirable code in a secure memory of a security system, the trusted variables comprising:
a directory of files written to since a last scan; and
a directory of files that have not been written to since the last scan; and
accelerate a scan for identifiers of undesirable code by utilizing the trusted variables to reduce a number of files to be scanned and/or reduce a number of identifiers of undesirable code used for scanning;
wherein files written to since the last scan are scanned against all known identifiers of undesirable code; and
wherein files that have not been written to since a last scan are scanned only against newly introduced identifiers of undesirable code;
wherein the computer readable program code is unable to directly access the secure memory.

28. The product according to claim 27, wherein the trusted variables further comprise a trusted scan timestamp; and
wherein the newly introduced identifiers of undesirable code are determined relative to the trusted scan timestamp stored in the secure memory.

29. The product according to claim 27, wherein the files that have been written to since the last scan are stored in a read/write area of a storage device; and
wherein the files that have not been written to since the last scan are stored in a first area of a storage device; and
wherein files in the first area are bypassed in a subsequent scan in response to a determination that:
the first area has not been written to since a prior scan; and
the files in the first area have been scanned in a prior scan against all known identifiers of undesirable code;
the files in the first area that are bypassed resulting in a bypassed area.

30. The product according to claim 29, wherein the first area is securely configurable between a normal read-only state and a writeable state, the configuration being under the control of the security system.

31. The product according to claim 30, wherein the code is further effective to:
upon successfully scanning the files in the read/write area, activate and authenticate a first security measure of the security system to configure the first area to the writeable state, wherein the authentication executes out of the secure memory;
write the successfully scanned files in the read/write area to the first area; and
configure the first area to a read-only state after writing of successfully scanned files.

32. The product according to claim 31, wherein the authentication for the first security measure is an authentication selected from the group consisting of a password, a digital signature, and a biometric.

33. The product according to claim 27, wherein the code is further effective to:
request from the security subsystem a trusted scan timestamp of when the last scan was executed and which is trusted by virtue of the secure memory; and
scan the bypassed area against a newly introduced identifier which is associated with malicious code known to have come into existence on a new identifier date, wherein the scan of the bypassed area occurs in response to a determination that a new identifier timestamp, which is related to the new identifier date, is earlier than the trusted scan timestamp; and wherein the bypassed area is not scanned for other known identifiers of malicious code that were included in the last scan of the bypassed area.

34. A product comprising:
a tangible computer usable medium having computer readable program code stored therein, the computer readable program code in said product being effective to:
store trusted variables that pertain to prior scans for identifiers of undesirable code in a secure memory of a security subsystem, the secure memory being inaccessible to code executed by an operating system, the trusted variables comprising:
a trusted scan timestamp; and
accelerate a scan for identifiers of undesirable code by utilizing the trusted variables to reduce a number of files to be scanned and/or reduce a number of undesirable code identifiers used for scanning;
wherein files that have not been written to since the last scan are scanned only against newly introduced identifiers of undesirable code; and
wherein the newly introduced identifiers of undesirable code are determined relative to the trusted scan timestamp stored in the secure memory.

35. An apparatus comprising:
a processor; and
a main memory that stores code which is executed under an operating system by the processor;
a security subsystem having a secure memory which is inaccessible to the code which is executed under the operating system by said processor, the secure memory storing trusted variables that pertain to prior scans for undesirable code, the trusted variables comprising:
a trusted scan timestamp;
wherein the storage device is operatively coupled to said processor and said security subsystem and is subdivided into a first area and a read/write area, the first area being securely configurable under the control of said security system between a normal read-only state and a writeable state;
wherein the security system is configured to accelerate a scan for identifiers of undesirable code by utilizing the trusted variables to reduce a number of files to be scanned and/or to reduce a number of identifiers of undesirable code to be used for scanning;
wherein files written to since the last scan are stored in the read/write area, whereby the files written to since the last scan are scanned against all known identifiers of undesirable code; and
wherein files that have not been written to since a last scan are stored in the first area, whereby the files that have not been written to since the last scan are scanned only against newly introduced identifiers of undesirable code as determined by referencing the trusted variables.

36. A method comprising:
storing at least one trusted variable that pertains to a prior scan for identifiers of undesirable code in a secure memory of a security subsystem, the secure memory being inaccessible to code executed by an operating system, the at least one trusted variable comprising:

a trusted scan timestamp;

accelerating a scan for identifiers of undesirable code by utilizing the at least one trusted variable to reduce a number of files to be scanned and/or reduce a number of undesirable code identifiers used for scanning;

wherein files that have not been written to since the last scan are scanned only against newly introduced identifiers of undesirable code; and wherein the newly introduced identifiers of undesirable code are determined relative to the trusted scan timestamp stored in the secure memory.

* * * * *